(12) United States Patent
Lee et al.

(10) Patent No.: US 12,391,829 B2
(45) Date of Patent: Aug. 19, 2025

(54) POLYARYLENE SULFIDE RESIN COMPOSITION, METHOD OF PREPARING POLYARYLENE SULFIDE RESIN COMPOSITION, AND HEAT INSULATING MATERIAL MANUFACTURED USING POLYARYLENE SULFIDE RESIN COMPOSITION

(71) Applicant: LG CHEM, LTD., Seoul (KR)

(72) Inventors: Ran Hee Lee, Daejeon (KR); Soong In Kim, Daejeon (KR); Myong Jo Ham, Daejeon (KR)

(73) Assignee: LG Chem, Ltd., Seoul (KR)

( * ) Notice: Subject to any disclaimer, the term of this patent is extended or adjusted under 35 U.S.C. 154(b) by 759 days.

(21) Appl. No.: 17/292,996

(22) PCT Filed: Oct. 23, 2020

(86) PCT No.: PCT/KR2020/014593
§ 371 (c)(1),
(2) Date: May 11, 2021

(87) PCT Pub. No.: WO2021/080379
PCT Pub. Date: Apr. 29, 2021

(65) Prior Publication Data
US 2022/0002544 A1   Jan. 6, 2022

(30) Foreign Application Priority Data

Oct. 25, 2019  (KR) .................. 10-2019-0133913
Oct. 25, 2019  (KR) .................. 10-2019-0133914
Oct. 23, 2020  (KR) .................. 10-2020-0138009

(51) Int. Cl.
| C08L 81/02 | (2006.01) |
| C08K 7/14 | (2006.01) |
| C08K 9/06 | (2006.01) |
| C08L 79/08 | (2006.01) |

(52) U.S. Cl.
CPC ............... *C08L 81/02* (2013.01); *C08K 7/14* (2013.01); *C08K 9/06* (2013.01); *C08L 79/085* (2013.01); *C08L 2203/20* (2013.01); *C08L 2203/30* (2013.01)

(58) Field of Classification Search
None
See application file for complete search history.

(56) References Cited

U.S. PATENT DOCUMENTS

| 5,384,391 | A | * | 1/1995 | Miyata | .................. | C08G 75/06 |
| | | | | | | 528/379 |
| 6,042,910 | A | | 3/2000 | Kinouchi et al. | | |
| 2007/0123627 | A1 | * | 5/2007 | Baek | ...................... | C08L 81/02 |
| | | | | | | 524/425 |
| 2007/0278452 | A1 | * | 12/2007 | Li | ........................... | C08K 3/22 |
| | | | | | | 524/430 |
| 2017/0145165 | A1 | * | 5/2017 | Yamanaka | ......... | C08G 75/0213 |
| 2018/0346721 | A1 | * | 12/2018 | Lee | ...................... | B29C 48/022 |

FOREIGN PATENT DOCUMENTS

| CN | 104046001 A | 9/2014 |
| CN | 106147230 A | 11/2016 |
| CN | 108884318 A | 11/2018 |
| JP | H01185366 A | 7/1989 |
| JP | H02180962 A | 7/1990 |
| JP | H0480262 A | 3/1992 |
| JP | 05-239354 A | 9/1993 |
| JP | 11-29712 A | 2/1999 |
| JP | 2001-165557 A | 6/2001 |
| JP | 2002012763 A | 1/2002 |
| JP | 2003-301108 A | 10/2003 |
| JP | 2004051895 A | 2/2004 |
| JP | 2008188960 A | 8/2008 |
| JP | 2009173865 A | 8/2009 |
| JP | 2010260964 A | 11/2010 |
| JP | 2010-281444 A | 12/2010 |
| JP | 2012-25909 A | 2/2012 |
| JP | 2015-105359 A | 6/2015 |
| JP | 2017082159 A | * | 5/2017 |
| JP | 2018053003 A | 4/2018 |
| KR | 10-2009-0023367 A | 3/2009 |
| KR | 10-2014-0090326 A | 7/2014 |
| KR | 10-2014-0092454 A | 7/2014 |
| KR | 10-2014-0092472 A | 7/2014 |
| KR | 10-2019-0075843 A | 7/2019 |
| KR | 10-2019-0077760 A | 7/2019 |
| WO | 2008062838 A1 | 5/2008 |
| WO | WO-2015020142 A1 | * | 2/2015 | ............. C08G 75/02 |

* cited by examiner

*Primary Examiner* — Anthony J Frost
(74) *Attorney, Agent, or Firm* — Bryan Cave Leighton Paisner LLP

(57) ABSTRACT

Disclosed is a heat insulating material composition including crosslinked polyarylene sulfide and glass fiber. The heat insulating material composition according to an embodiment of the present disclosure can realize excellent insulation performance and has excellent impact resistance and support performance, even when provided in a thin thickness. Accordingly, the heat insulating material composition according to an embodiment of the present disclosure can be applied usefully to electronic products, such as a refrigerator, requiring an adiabatic body.

14 Claims, No Drawings

POLYARYLENE SULFIDE RESIN COMPOSITION, METHOD OF PREPARING POLYARYLENE SULFIDE RESIN COMPOSITION, AND HEAT INSULATING MATERIAL MANUFACTURED USING POLYARYLENE SULFIDE RESIN COMPOSITION

CROSS-REFERENCE TO RELATED APPLICATIONS

This application is a National Phase entry pursuant to 35 U.S.C. § 371 of International Application No. PCT/KR2020/014593, filed on Oct. 23, 2020, and claims priority to and the benefit of Korean Patent Application No. 10-2019-0133913, filed on Oct. 25, 2019, Korean Patent Application No. 10-2019-0133914, filed on Oct. 25, 2019, and Korean Patent Application No. 10-2020-0138009, filed on Oct. 23, 2020, based on the priority of the above two patents, with the Korean Intellectual Property Office, the disclosures of which are hereby incorporated by reference in their entirety for all purposes as if fully set forth herein.

FIELD OF INVENTION

The present invention relates to a polyarylene sulfide resin composition, a method of preparing the polyarylene sulfide resin composition, and a heat insulating material manufactured using the polyarylene sulfide resin composition, and more particularly, to a polyarylene sulfide resin composition having excellent flowability and less outgassing, and exhibiting excellent insulation performance and mechanical strength even when the thickness of a product derived therefrom is thin; a method of preparing the polyarylene sulfide resin composition; and a heat insulating material manufactured using the polyarylene sulfide resin composition.

BACKGROUND ART

Recently, the necessity of reducing the power consumption of home appliances has been asserted due to concerns about global warming. In particular, refrigerators among home appliances are products which consume a large amount of power, and thus, reduction of the amount of power consumed by refrigerators is an indispensable issue in countermeasures against global warming. The power consumption of a refrigerator is mostly determined by the efficiency of a cooling compressor and the insulation performance of a heat insulating material, which is related to the amount of heat leakage from the inside of the refrigerator, when the load inside the refrigerator is constant. Accordingly, it is becoming important to improve the efficiency of a cooling compressor in a refrigerator and the performance of a heat insulating material therein.

In the case of conventional refrigerators, a foamed polyurethane (PU) insulation wall having a thickness of approximately 30 cm or more is commonly provided, although there is a difference depending on a cooling compartment and a freezing compartment. However, in this case, there is a problem that the internal volume of the refrigerator is reduced.

Accordingly, to provide a high-performance heat insulating material, a vacuum heat-insulating material has been applied to refrigerators.

A vacuum heat-insulating material can keep the inside of a refrigerator body in a vacuum, and thus, can be provided in a thin thickness and can suppress heat transfer due to convection and conduction.

Japanese Patent Application Publication No. 2001-165557 discloses a refrigerator provided with a conventional vacuum heat-insulating material. A refrigerator according to the patent document includes a vacuum heat-insulating body in which a core material made of a sheet-like inorganic fiber assembly is covered with a shell material made of a gas barrier film to seal the inside thereof under reduced pressure. This vacuum heat-insulating body is placed in a space formed by an outer box and an inner box, and a formed heat insulating material is filled around the boxes to form insulating walls.

However, in the case of existing vacuum heat-insulating materials, a large amount of outgassing occurs during a manufacturing process due to used organic compounds, processability is decreased due to poor flowability of a resin composition for a heat insulating material, and mechanical properties required to support a refrigerator are insufficient. Accordingly, there is still a need for the development of a vacuum insulation material that is thin and has excellent impact resistance, etc.

DISCLOSURE

Technical Problem

Therefore, the present invention has been made in view of the above problems, and it is one object of the present invention to provide a polyarylene sulfide resin composition that allows production of a heat insulating material having excellent surface properties due to less outgassing, has excellent insulation performance and flowability, exhibits excellent mechanical strength, such as excellent impact resistance, even when provided in a thin thickness; a method of preparing the polyarylene sulfide resin composition; and a heat insulating material manufactured using the polyarylene sulfide resin composition.

The above and other objects can be accomplished by the present invention described below.

Technical Solution

In accordance with an aspect of the present invention, the above and other objects can be accomplished by the provision of a polyarylene sulfide resin composition including, for example, 100 parts by weight of a crosslinked polyarylene sulfide resin and 80 to 120 parts by weight of glass fiber.

The glass fiber is included in an amount of preferably 90 to 100 parts by weight, for example, 100 parts by weight, based on 100 parts by weight of the crosslinked polyarylene sulfide resin.

In accordance with another aspect of the present invention, there is provided a polyarylene sulfide resin composition including a crosslinked polyarylene sulfide resin and epoxy silanized glass fiber and having a TVOC value of 120 ppm or less and a volatile weight loss of 0.15% or less.

The polyarylene sulfide resin composition is preferably used as a heat insulating material.

In accordance with still another aspect of the present invention, there is provided a polyarylene sulfide resin composition including preferably 100 parts by weight of a crosslinked polyarylene sulfide having a melt index (315°

C., 5 kg) of 50 to 480 g/10 min, 60 to 120 parts by weight of glass fiber, and 0.01 to 3 parts by weight of an anti-hydrolysis agent.

In accordance with still another aspect of the present invention, there is provided a method of preparing a polyarylene sulfide resin composition, the method preferably including melt-kneading and extruding 100 parts by weight of a crosslinked polyarylene sulfide having a melt index (315° C., 5 kg) of 50 to 480 g/10 min, 60 to 120 parts by weight of glass fiber, and 0.01 to 3 parts by weight of an anti-hydrolysis agent.

In accordance with yet another aspect of the present invention, there is provided a heat insulating material including the polyarylene sulfide resin composition of the present disclosure.

Advantageous Effects

As apparent from the above description, a polyarylene sulfide resin composition according to the present invention can provide excellent insulation performance when provided in a thin thickness, can provide excellent workability due to excellent flowability, can provide molded articles having excellent surface properties and maintain a vacuum state for a long time due to less outgassing, particularly can be usefully applied to electronic products, such as refrigerators, requiring a heat insulating material due to provision of improved mechanical strength.

In addition, the polyarylene sulfide resin composition according to the present invention can improve an internal volume ratio of electronic products, impact resistance, and support performance, and can increase energy use efficiency due to improvement in insulation performance, thus having high industrial applicability.

BEST MODE

In the specification, when a certain part "includes" a certain component, this indicates that the part may further include another component instead of excluding another component unless there is no different disclosure.

The polyarylene sulfide resin composition of the present invention includes, for example, 100 parts by weight of a crosslinked polyarylene sulfide resin and 80 to 120 parts by weight of glass fiber. Within these ranges, excellent impact resistance and sufficient insulation performance are provided even when provided in a thin thickness.

The glass fiber is preferably included in an amount of 90 to 100 parts by weight, for example, 100 parts by weight based on 100 parts by weight of the crosslinked polyarylene sulfide resin. Within these ranges, excellent impact resistance and sufficient insulation performance are provided even when provided in a thin thickness.

In another embodiment, the polyarylene sulfide resin composition of the present invention includes a crosslinked polyarylene sulfide resin and epoxy silanized glass fiber, wherein a TVOC value is 120 ppm or less, and a volatile weight loss is 0.15% or less. In this case, a heat insulating material having excellent surface properties due to good flowability and less outgassing, and excellent vacuum holding properties, as well as excellent heat insulation properties, can be obtained.

The polyarylene sulfide resin composition of the present invention preferably includes 100 parts by weight of a crosslinked polyarylene sulfide having a melt index (315° C., 5 kg) of 50 to 480 g/10 min, 60 to 120 parts by weight of glass fiber, and 0.01 to 3 parts by weight of an anti-hydrolysis agent. Within these ranges, moldability and the quality of a molded article are excellent due to less weight reduction during heating, the surface properties of a molded article are excellent due to less outgassing, processability is excellent due to good flowability, mechanical strength such as impact resistance is excellent, and heat insulation properties are excellent.

Hereinafter, the polyarylene sulfide resin composition according to the present disclosure, a method of preparing the polyarylene sulfide resin composition; and each component of a heat insulating material manufactured using the polyarylene sulfide resin composition are described in detail.

Polyarylene Sulfide Resin

A polyarylene sulfide resin of the present disclosure is preferably a crosslinked polyarylene sulfide having a melt index (315° C., 5 kg) of 50 to 480 g/10 min. Within this range, excellent mechanical properties, heat resistance, processability, and heat insulation properties are provided.

A polydispersity index (PDI), which is calculated as Mw/Mn, of the polyarylene sulfide resin is preferably 5 to 7, more preferably 5.1 to 6.9, even more preferably 5.2 to 6.8, still even more preferably 5.3 to 6.6, particularly preferably 5.3 to 6.5, particularly more preferably 5.4 to 6.4. Within these ranges, moldability and the quality of a molded article are excellent due to less weight reduction during heating, and all of excellent mechanical properties, heat resistance, processability, and heat insulation properties are provided.

The crosslinked polyarylene sulfide resin can be prepared, for example, through a heat curing process in a polymerization process, unlike a linear polyarylene sulfide resin prepared through improved polymerization reaction without undergoing a heat curing process. However, within the scope of the definition of the present invention, any resin referred as a crosslinked polyarylene sulfide resin in the technical field to which the present invention belongs can be used without specific limitation. As particular examples, commercially available crosslinked polyphenylene sulfides such as NHU 21150C, Toray M2900, and Tosoh B385 can be used.

The polyarylene sulfide resin can be, for example, an oligomer-free polyarylene sulfide resin. In this case, gas generation is remarkably reduced during processing at high temperatures so that haze is reduced. Accordingly, excellent appearance characteristics can be provided and mechanical properties can be maintained.

In the present disclosure, the oligomer-free polyarylene sulfide resin can be a polyarylene sulfide resin that is washed with acetone or a combination of acetone and deionized water to remove oligomers therein, unless otherwise specified. Here, "oligomer-free" means that oligomers are removed. As particular examples, in the case of "oligomer-free," the content of oligomers can be 500 ppm or less, or 300 ppm or less, preferably 100 ppm or less, more preferably 10 to 50 ppm.

The oligomer can be, for example, one or more selected from the group consisting of 2,6-diisopropylphenyl isocyanate, 2,6-diisopropylaniline, 1,4-bis(phenylthio)-benzene, 1,6-hexanediol and p-chloro-N-methylaniline. When such oligomers are removed, haze can be reduced and mechanical properties can be improved.

The melt index of the crosslinked polyarylene sulfide resin is preferably 50 to 470 g/10 min, more preferably 50 to 460 g/10 min, even more preferably 50 to 450 g/10 min, still even more preferably 100 to 450 g/10 min, particularly preferably 150 to 450 g/10 min, particularly more preferably 200 to 450 g/min. Within these ranges, excellent mechanical properties, heat resistance, processability, and heat insulation properties are provided.

The weight-average molecular weight (Mw) of the crosslinked polyarylene sulfide is preferably 3×10⁵ to 4×10⁵ g/mol, more preferably 3.0×10⁵ to 3.9×10⁵ g/mol, even more preferably 3.0×10⁵ to 3.7×10⁵ g/mol, still even more preferably 3.0×10⁵ to 3.5×10⁵ g/mol, particularly preferably 3.1×10⁵ to 3.5×10⁵ g/mol, particularly more preferably 3.1×10⁵ to 3.4×10⁵ g/mol. Within these ranges, excellent mechanical properties, heat resistance, processability, and heat insulation properties are provided.

The number average molecular weight (Mn) of the crosslinked polyarylene sulfide is preferably 0.51×10⁵ to 8×10⁵ g/mol, more preferably 0.51×10⁵ to 7×10⁵ g/mol, even more preferably 0.51×10⁵ to 6×10⁵ g/mol, still even more preferably 0.52×10⁵ to 0.59×10⁵ g/mol, particularly preferably 0.53×10⁵ to 0.58×10⁵ g/mol, particularly more preferably 0.54×10⁵ to 0.56×10⁵ g/mol. Within these ranges, excellent mechanical properties, heat resistance, processability, and heat insulation properties are provided.

The total volatile organic compounds (TVOC) of the crosslinked polyarylene sulfide is preferably 200 ppm or less, more preferably 150 ppm or less, even more preferably 100 ppm or less. Within these ranges, moldability and the quality of a molded article are excellent due to less weight reduction during heating, mechanical properties and heat insulation properties are excellent, and it has eco-friendly advantages due to little emission of substances harmful to the human body.

The polyarylene sulfide resin is preferably a polyphenylene sulfide resin.

The polyphenylene sulfide resin can contain, for example, 70 mol % or more, or 70 to 99.9 mol % of a unit having the structure represented by [Formula 1] below:

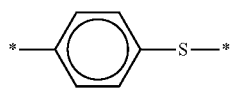

[Formula 1]

The polyphenylene sulfide resin contain preferably 30 mol % or less, or 0.1 to 30 mol % of one or more selected from the group consisting of copolymer units having the structure represented by [Formula 2] below:

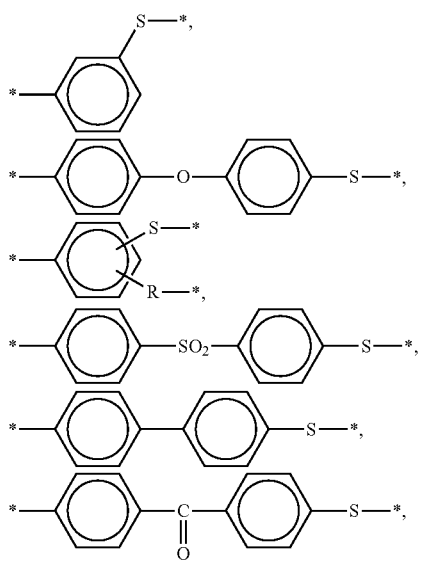

[Formula 2]

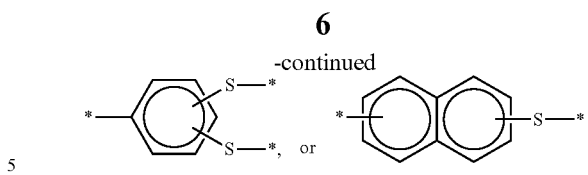

The crosslinked polyarylene sulfide has excellent chemical resistance, excellent heat resistance (heat deflection temperature: 270° C. or more), and its own flame retardancy, thus corresponding to an ecofriendly flame retardant resin capable of providing flame retardancy without a flame retardant.

In the case of the crosslinked polyarylene sulfide, the degree of fogging (haze) of gas that is collected on a glass at an oil bath temperature of 240° C. and a cooling temperature of 23° C. for a fogging time of 5 hours using a hazemeter is preferably 6 or less, more preferably 5 or less, even more preferably 4.5 or less, still even more preferably 4.2 or less. Within these ranges, the surface properties of a molded article are excellent due to less outgassing, a vacuum state can be maintained for a long time, and the balance of the remaining properties are excellent.

Glass Fiber

Glass fiber of the present disclosure is included in an amount of preferably 60 to 120 parts by weight, more preferably 60 to 110 parts by weight, even more preferably 60 to 105 parts by weight, still even more preferably 65 to 105 parts by weight, particularly preferably 67 to 105 parts by weight, particularly more preferably 67 to 101 parts by weight. Within these ranges, the moldability and the quality of a molded article are excellent due to less weight reduction during heating, and mechanical properties and heat insulation properties are excellent.

The glass fiber is preferably a glass fiber surface-treated with a silane-based compound, more preferably a glass fiber surface-treated with an epoxy silane compound or a glass fiber surface-treated with an amino silane compound, even more preferably a glass fiber surface-treated with an epoxy silane compound. In these cases, the compatibility with the polyarylene sulfide resin can be further improved, and thus, the moldability of a resin composition including the polyarylene sulfide resin and the glass fiber can be improved.

The silane-based compound, which is a sizing agent, serves to bind glass fiber filaments and impart desired properties to a surface of glass fiber.

The epoxy silane compound is not specifically limited so long as it is an epoxy silane compound generally used for surface treatment of glass fiber. As a preferred example, the epoxy silane compound can be a compound represented by Formula 3 below:

$$(R_1)_a\text{—Si—}(X)_b \qquad \text{[Formula 3]}$$

In Formula 3, $R_1$ has at least one epoxy group, X is a hydroxy group, or a substituent capable of reacting with water to form a hydroxy group, a is an integer of 1 to 3, b is an integer of 1 to 3, and a+b=4.

As another preferred embodiment, the epoxy silane compound can be a compound represented by Formula 4 below:

$$(R'O)_3\text{Si—R—X} \qquad \text{[Formula 4]}$$

In Formula 4, R'O is methoxy, ethoxy, or acetoxy, R is a bond or an alkylene group having 1 to 5 carbon atoms, and X is an epoxy group.

The silane-based compound is included preferably in an amount of 0.10 to 0.50 parts by weight based on a total of 100 parts by weight of the glass fiber that is not surface-treated. Within these ranges, the compatibility with the polyarylene sulfide resin can be further improved, so that the moldability of a resin composition including the silane-based compound and the polyarylene sulfide resin can be improved.

The glass fiber has an average diameter of preferably 5 to 15 μm, more preferably 10 to 15 μm, and an average length of preferably 1 to 5 mm, more preferably 10 to 15 μm. Within these ranges, the moldability and the quality of a molded article are excellent due to less weight reduction during heating, the mechanical strength of the crosslinked polyarylene sulfide resin is complemented so that mechanical strength is improved, and heat resistance and heat insulation properties are excellent.

In the present disclosure, the average diameter and average length of the glass fiber are not specifically limited so long as they are measured by methods commonly used in the art. For example, an average value obtained by measuring 50 glass fibers with an SEM electron microscope can be used.

The glass fiber can be manufactured, for example, by melting various oxides for forming glass, and then pulling out thin thread-shaped glass filaments through bushing, and then coating the glass filaments with a sizing agent, and then combining the coated glass filaments to have a strand shape.

The glass fiber, for example, can be formed in a filament shape, i.e., in a strand shape in which several strands (e.g., 3000 to 5000 or 4000 strands) are combined. This strand is preferably cut to a certain length through chopping and dried to obtain chopped strands.

The glass fiber can be any commercially available one, within the scope of the definition of the present invention. As examples of the glass fiber, 309C (manufacturer: CPIC), 910-10P, 415A, etc. may be used.

Anti-Hydrolysis Agent

The anti-hydrolysis agent of the present disclosure is included in an amount of preferably 0.01 to 3 parts by weight, more preferably 0.05 to 2 parts by weight, even more preferably 0.05 to 1 parts by weight, still even more preferably 0.05 to 0.5 parts by weight, particularly preferably 0.1 to 0.5 parts by weight, particularly more preferably 0.1 to 0.3 parts by weight, based on 100 parts by weight of the polyarylene sulfide resin. Within these ranges, the surface properties of a molded article are excellent due to less outgassing even when processed at a high temperature, and excellent heat insulation properties are provided because a vacuum state can be maintained for a long time.

The anti-hydrolysis agent is preferably a carbodiimide-based polymer. In this case, the surface properties of a molded article are excellent due to less outgassing even when processed at a high temperature, and excellent heat insulation properties are provided because a vacuum state can be maintained for a long time.

The melting point of the carbodiimide-based polymer is preferably 56 to 95° C., more preferably 60 to 90° C. Within these ranges, the surface properties of a molded article are excellent due to less outgassing even when processed at a high temperature, and excellent heat insulation properties are provided because a vacuum state can be maintained for a long time.

In the present disclosure, a method of measuring a melting point is not specifically limited so long as the method is a method commonly used in the technical field to which the present invention belongs. For example, a melting point can be measured by DSC.

The carbodiimide-based polymer is preferably a compound represented by Formula 5 below. In this case, there is an advantage that the surface properties of a molded article are excellent due to less outgassing even at a high temperature:

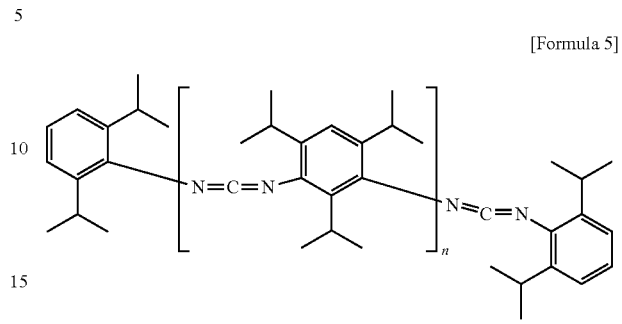

[Formula 5]

wherein n is an integer of 1 to 15.

The carbodiimide-based polymer represented by Formula can be prepared, for example, by condensation polymerization between 2,6-diisopropylphenyl isocyanate (DIPPI) and 2,4,6-triisopropyl-m-phenylene diisocyanate (TRIDI) as in Reaction Scheme 1 below:

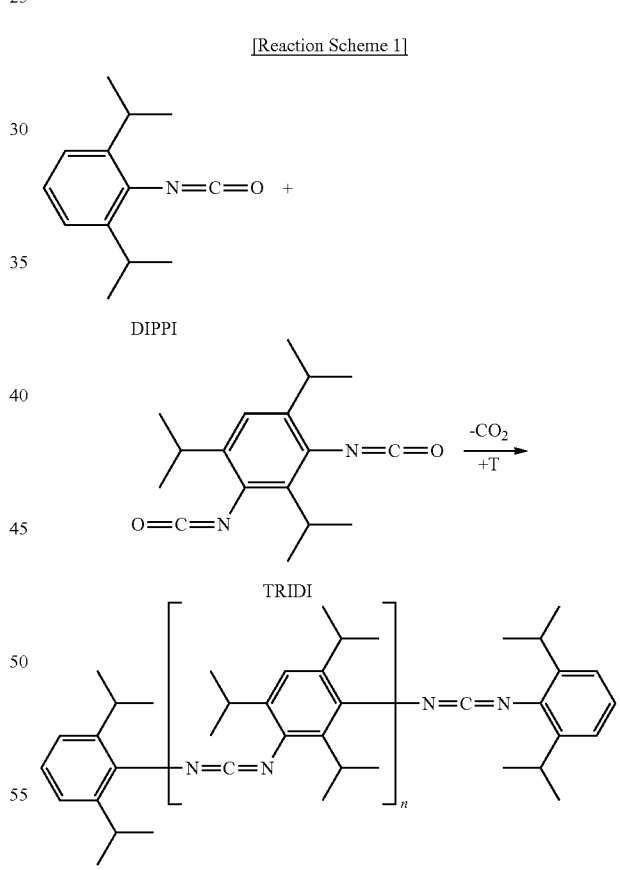

[Reaction Scheme 1]

In Reaction Scheme 1, +T denotes heating to a predetermined reaction temperature, and —$CO_2$ denotes that $CO_2$ is removed from a starting material during reaction.

The weight-average molecular weight of the carbodiimide-based polymer is preferably 500 to 4,000 g/mol, more preferably 1,000 to 3,000 g/mol. Within these ranges, the surface properties of a molded article are excellent due to less outgassing even when processed at a high temperature, and excellent heat insulation properties are provided because a vacuum state can be maintained for a long time.

In the present disclosure, weight average molecular weight is a relative value for a PS standard (polystyrene standard) sample at 40° C. using gel chromatography (GPC) filled with porous silica, as a column-filling material, and tetrahydrofuran (THF), as a solvent.

In the present disclosure, the carbodiimide-based polymer can be included preferably as a mixture of 90 to 99.9% by weight of a carbodiimide-based polymer and 0.1 to 10% by weight of a supplement, more preferably as a mixture of 92 to 98% by weight of a carbodiimide-based polymer and 2 to 8% by weight of a supplement, even more preferably as a mixture of 95 to 97% by weight of a carbodiimide-based polymer and 3 to 5% by weight of a supplement. Within these ranges, there is an advantage that the performance of the supplement is well expressed without inhibiting the desired effect of the present invention.

The supplement is preferably silica. In this case, there is an advantage that the surface properties of a molded article are excellent due to less outgassing even at a high temperature.

Polyarylene Sulfide Resin Composition

The heating loss, which is calculated according to Mathematical Equation 1 below, of the polyarylene sulfide composition of the present disclosure is preferably 0.10 or less, more preferably 0.099 or less, even more preferably 0.095 or less, still even more preferably 0.09 or less. With regard to the heating loss of the polyarylene sulfide composition, a preferred example thereof is 0.06 to 0.10, a more preferred example thereof is 0.06 to 0.099, an even more preferred example thereof is 0.06 to 0.095, and an even much more preferred example thereof is 0.06 to 0.09. Within these ranges, there are advantages that the moldability and the quality of a molded article are excellent due to less weight reduction during heating, and the balance of the remaining properties are excellent.

Heating loss (%)=[(Weight after heating at 120° C. for 2 hours−Weight after heating at 260° C. for 2 hours)/(Weight after heating at 120° C. for 2 hours)]×100     [Mathematical Equation 1]

A difference in weight before and after heating at 120° C. for 2 hours means a moisture reduction amount.

The polyarylene sulfide composition can further include at least one additive selected from among a coupling agent, an antioxidant and a lubricant, as needed. In this case, tensile strength, impact strength, and flexural strength can be further improved.

The additive can be included, for example, in an amount of 0.2 to 0.5 parts by weight based on a total of 100 parts by weight of the crosslinked polyarylene sulfide. As another example, the additive can be included in an amount of 0.15 to 0.4 parts by weight based on a total of 100 parts by weight of the crosslinked polyarylene sulfide. As a particular example, the additive can be included in an amount of 0.1 to 0.3 parts by weight based on a total of 100 parts by weight of the crosslinked polyarylene sulfide. Within these ranges, flowability and heat resistance can be further improved.

As other examples, the additive can be included in an amount of 0.4 parts by weight or less, preferably 0.1 parts by weight or less, more preferably 0.01 parts by weight or less, based on a total of 100 parts by weight of the crosslinked polyarylene sulfide. Within these ranges, tensile strength, flexural strength and impact strength can be further improved without deterioration in insulation performance. In this case, the polyarylene sulfide composition of the present disclosure can be referred to as an additive-free polyarylene sulfide composition. [90] The melt index (315° C., 5 kg) of the polyarylene sulfide composition is preferably 22 to 43 g/10 min, more preferably 23 to 41 g/10 min, even more preferably 23 to 32 g/10 min. Within these ranges, there is an advantage that excellent surface properties are exhibited due to excellent flowability.

The volatile weight loss of the polyarylene sulfide composition is preferably 0.15% or less, more preferably 0.13% or less, even more preferably 0.12% or less. Within these ranges, there is an advantage that excellent heat insulation properties are exhibited.

The tensile strength of the polyarylene sulfide composition is preferably 200 to 250 MPa, more preferably 210 to 250 MPa. Within these ranges, there is an advantage that insulation performance and tensile strength are excellent even in the case of a thin thickness.

The flexural strength of the polyarylene sulfide composition is preferably 290 to 350 MPa, more preferably 290 to 350 MPa. Within these ranges, there is an advantage that insulation performance and flexural strength are excellent even in the case of a thin thickness.

The heat deflection temperature of the polyarylene sulfide composition is preferably 270 to 300° C., more preferably 273 to 300° C. Within these ranges, there is an advantage that a heat insulating material having excellent heat resistance can be provided.

The polyarylene sulfide composition can exhibit excellent insulation performance and can provide impact resistance and support performance even when provided in a thin thickness, thus being capable of usefully applied to electronic products, such as a refrigerator, requiring a vacuum heat-insulating material. By using the vacuum heat-insulating material, an internal volume ratio of electronic products can be increased, energy use efficiency can be greatly increased due to improvement in impact resistance, support performance and heat insulation effect, and the effective volume of electronic products can be greatly increased.

Accordingly, the polyarylene sulfide composition of the present disclosure is particularly suitable for a refrigerator heat insulating material, without being limited thereto. The polyarylene sulfide composition can also be applied to various electric/electronic devices such as a cryogenic refrigerator, a heating device, or a blower.

An injection specimen as much as its total surface area to be 147,840 mm$^2$ produced through injection-molding of the polyarylene sulfide composition was placed in a vacuum bath having a vacuum bath volume of 3.26 L, and was evacuated under conditions such as a volume/surface of 2.21 E−03 l/cm$^2$, an exhaust temperature of 150° C., and an exhaust time of 15 hours to make the inside of the bath to a vacuum state. Thereafter, the rate of increase in pressure inside the bath was measured from a time point of 4.5 to 5 hours to a time point of 12 hours. The pressure increase rate is preferably $1.77\times10^{-4}$ torr/h or less, more preferably $1.75\times10^{-4}$ torr/h or less, even more preferably $1.7\times10^{-4}$ torr/h or less, still even more preferably $1.65\times10^{-4}$ torr/h or less, particularly preferably $1.0\times10^{-4}$ torr/h or less, particularly more preferably $0.9\times10^{-4}$ torr/h or less, $0.5\times10^{-4}$ torr/h to $1.77\times10^{-4}$ torr/h as a particular example, $0.5\times10^{-4}$ torr/h to $1.75\times10^{-4}$ torr/h as a preferred example, $0.5\times10^{-4}$ torr/h to $1.7\times10^{-4}$ torr/h as a more preferred example, $0.5\times10^{-4}$ torr/h to $1.65\times10^{-4}$ torr/h as an even more preferred example, $0.5\times10^{-4}$ torr/h to $1.0\times10^{-4}$ torr/h as an even much more preferred example, $0.5\times10^{-4}$ torr/h to $0.9\times10^{-4}$ torr/h as the most preferred example. Within these ranges, there is an advantage that heat insulation properties and the balance between properties are excellent. Here, the injection-molded specimen is not particularly limited so long as the surface area thereof is 147,840 mm$^2$. As particular examples, the injection-molded specimen can be manufactured in the form of a disk or disk/square, or 9 specimens having the shape of 5×5 spacers (lattice formation) can be appropriate, for convenience of measurement. In addition, an apparatus or device for measuring the pressure increase rate, etc. is not specifically limited so long as the apparatus or device is within the scope of the definition and conditions of the present invention and is an apparatus or device generally used in the technical field to which the present invention belongs.

An injection specimen with a surface area of 147,840 mm$^2$ produced through injection-molding of the polyarylene sulfide composition was placed in a vacuum bath having a vacuum bath volume of 3.26 L, and was evacuated under conditions such as a volume/surface of 2.21 E–03 l/cm$^2$, an exhaust temperature of 150° C., and an exhaust time of 15 hours to make the inside of the bath to a vacuum state. Thereafter, the rate of increase in pressure inside the bath was measured from a time point of 4.5 to 5 hours to a time point of 12 hours. An outgassing rate was calculated from the pressure increase rate. The outgassing rate is preferably $1.08\times10^{-10}$ torr·l/cm$^2$·sec or less, more preferably $1.07\times10^{-10}$ torr·l/cm$^2$·sec or less, even more preferably $1.05\times10^{-10}$ torr·l/cm$^2$·sec or less, still even more preferably $1.01\times10^{-10}$ torr·l/cm$^2$·sec or less, particularly preferably $0.9\times10^{-10}$ torr·l/cm$^2$·sec or less, particularly more preferably $0.6\times10^{-10}$ torr·l/cm$^2$·sec or less, particularly still even more preferably $0.55\times10^{-10}$ torr·l/cm$^2$·sec or less, most preferably $0.53\times10^{-10}$ torr·l/cm$^2$·sec or less, $0.1\times10^{-10}$ torr·l/cm$^2$·sec to $1.08\times10^{-10}$ torr·l/cm$^2$·sec as a particular example, $0.1\times10^{-10}$ torr·l/cm$^2$·sec to $1.07\times10^{-10}$ torr·l/cm$^2$·sec as a preferred example, $0.1\times10^{-10}$ torr·l/cm$^2$·sec to $1.05\times10^{-10}$ torr·l/cm$^2$·sec as a more preferred example, $0.1\times10^{-10}$ torr·l/cm$^2$·sec to $1.01\times10^{-10}$ torr·l/cm$^2$·sec as an even more preferred example, $0.1\times10^{-10}$ torr·l/cm$^2$·sec to $0.9\times10^{-10}$ torr·l/cm$^2$·sec as an even much more preferred example, $0.1\times10^{-10}$ torr·l/cm$^2$·sec to $0.6\times10^{-10}$ torr·l/cm$^2$·sec as a most preferred example. Within these ranges, there is an advantage that heat insulation properties and the balance between properties are excellent. Within these ranges, there is an advantage that heat insulation properties and the balance between properties are excellent. Here, the injection-molded specimen is not particularly limited so long as the surface area thereof is 147,840 mm$^2$. As particular examples, the injection-molded specimen can be manufactured in the form of a disk or disk/square, or 9 specimens having the shape of 5×5 spacers (lattice formation) can be appropriate, for convenience of measurement. In addition, an apparatus or device for measuring the pressure increase rate, etc. is not specifically limited so long as the apparatus or device is within the scope of the definition and conditions of the present invention and is an apparatus or device generally used in the technical field to which the present invention belongs. The outgassing rate calculated from the pressure increase rate can follow the unit of the outgassing rate.

The polyarylene sulfide composition has preferably a total volatile organic compound (TVOC) of 120 ppm or less, a tensile strength of 200 to 250 MPa, and a flexural strength of 290 to 350 MPa. Within these ranges, a heat insulating material having excellent heat insulation properties, good flowability, and excellent surface properties and vacuum holding properties due to less outgassing can be obtained.

The polyarylene sulfide composition has preferably a heat deflection temperature (HDT) of 270 to 300° C., and a melt index (315° C., 5 kg) of 23 to 41 g/10 min. Within these ranges, a heat insulating material having excellent heat insulation properties, good flowability, and excellent surface properties and vacuum holding properties due to less outgassing can be obtained.

Polyarylene Sulfide Resin Composition Preparation Method

The method of preparing the polyarylene sulfide resin composition of the present disclosure includes preferably a step of melt-kneading and extruding 100 parts by weight of a crosslinked polyarylene sulfide resin having a melt index (315° C., 5 kg) of 50 to 480 g/10 min, 60 to 120 parts by weight of glass fiber, and 0.01 to 3 parts by weight of an anti-hydrolysis agent. In this case, the moldability and the quality of a molded article are excellent due to less weight reduction during heating, the surface properties of a molded article are excellent due to less outgassing, processability is excellent due to good flowability, and mechanical strength, such as impact resistance, and heat insulation properties are excellent.

The method of preparing the polyarylene sulfide resin composition includes preferably a step of first mixing the crosslinked polyarylene sulfide resin, glass fiber and an anti-hydrolysis agent using a mixer or a super mixer, and then melt-kneading and extruding the resultant mixture using any one of various mixing processing equipment such as a twin-screw extruder, a single-screw extruder, roll-mills, a kneader, or a Banbury mixer.

The method of preparing the polyarylene sulfide resin composition can include, for example, a step of cutting a resultant extrudate after extrusion with a pelletizer to obtain a pellet, and a step of drying the pellet with a dehumidifying dryer or a hot air dryer. In this case, there is an effect that processing is easily performed in a subsequent injection-molding step.

The melt-kneading and extruding step can be performed, for example, at 285 to 330° C., preferably 290 to 320° C., more preferably 300 to 320° C.; and, for example, at 150 to 500 rpm, preferably 200 to 400 rpm, more preferably 200 to 300 rpm, in a twin-screw extruder. Within these ranges, there is an effect that processing is easily performed without decomposition of component materials.

Heat Insulating Material

A heat insulating material of the present disclosure is characterized by being manufactured from the polyarylene sulfide resin composition of the present disclosure. In this case, there are effects that the surface properties of a molded article are excellent, and mechanical strength, such as impact resistance, and heat insulation properties are excellent.

The heat insulating material is preferably a vacuum heat-insulating material for refrigerators. In this case, there are effects that the internal volume ratio of a refrigerator is increased, and energy use efficiency increases due to improvement in impact resistance, support performance and heat insulation effect.

The heat insulating material (insulation panel; insulation material) according to the present disclosure forms preferably an adiabatic body, more preferably an adiabatic body for refrigerators. In this case, there are advantages that the internal volume ratios of electronic products, such as a refrigerator, are increased, and energy use efficiency is greatly increased due to improvement in impact resistance, support performance and heat insulation effect. Accordingly, it is obvious that the present invention can include a heat insulating material made of the heat insulating material of the present disclosure.

A method of manufacturing the heat insulating material can include, for example, a step of injection-molding the melt-kneaded and extruded polyarylene sulfide resin composition pellet at an injection-molding temperature of 300 to 350° C., preferably 310 to 340° C.

In the injection molding, the polyarylene sulfide resin composition pellet can be injection-molded, for example, at a cylinder temperature of 300 to 350° C. and a mold temperature of 120 to 150° C.

Hereinafter, the present invention will be described in detail by describing exemplary embodiments of the invention. However, the invention can be embodied in many different forms and should not be construed as being limited to the embodiments set forth herein. These embodiments are provided to more fully describe the present invention to those skilled in the art.

EXAMPLES

Crosslinked polyphenylene sulfide resins (hereinafter referred to as "crosslinked PPS resin") and linear polyphenylene sulfide resins (hereinafter referred to as "linear PPS resin") used in the following examples and comparative examples are as follows:
1) 21150C (manufactured by NHU), 21330C (manufactured by NHU) and 21170C (manufactured by NHU) were used as crosslinked PPS resins.
2) 1150C (manufactured by NHU), 1170C (manufactured by NHU), 1190C (manufactured by NHU) and 11100C (manufactured by NHU) were used as linear PPS resins.
3) 1370C (manufactured by NHU) was used as a low-chlorine type linear PPS resin.

present in the measurement sample was confirmed, and a TVOC content was calculated according to Mathematical Equation 1 below:

$$TVOC_{compound} = [(A_{compound}/A_{std}) * C_{std}]/W_{sample} \quad \text{Equation 1]}$$

$TVOC_{compound}$: Content of volatile substances present in 1 g of measurement sample (ug/g)

$A_{compound}$: Sum of peak areas of respective chromatograms of volatile substances present in measurement sample $A_{std}$: Peak area of chromatogram of toluene standard solution $C_{std}$: Weight (about 1.7 ug) of toluene injected using toluene standard solution $W_{sample}$: Weight (g) of measurement sample

TABLE 1

| Classification | Linear type | | | Crosslinked type |
|---|---|---|---|---|
| | 1170C | 1190C | 11100C | 21150C |
| TVOC (ppm) | 529 | 664 | — | 96 |

As shown in Table 1, it was confirmed that crosslinked PPS, 21150C, generated the least amount of TVOC.

Melt Index (MI) Analysis

Based on the ISO 1133 standard for each grade of PPS resins, a melt index was measured at 315° C. for 10 minutes under a load of 5 kg and expressed as g/10 min. Here, Melt Indexcer (Model: G-01/manufacturer: toyoseiki) was used as a measurement equipment.

TABLE 2

| Classification | | Linear type | | | Crosslinked type | | |
|---|---|---|---|---|---|---|---|
| | | 1170C | 1190C | 11100C | 21330C | 21150C | 21170C |
| MI (g/10 min) | 315° C., 5 kg | 734 | 968 | 1217 | 250 | 447 | 750 |

4) 309C (manufactured by CPIC) surface-treated with an epoxy silane compound, 910-10P (manufactured by Owens corning) surface-treated with an amino silane compound, and a non-surface treated 415A (manufactured by Owens corning) were used as glass fibers.
5) Polycarbodiimide (manufactured by Lanxess) was used as an anti-hydrolysis agent.
6) A-187 (manufactured by Mometive) was used as a coupling agent.
7) AO-80 (manufactured by ADEKA) was used as an antioxidant.
8) WE-40P (manufactured by Clariant) was used as a lubricant.

The properties of each of the PPS resins were measured as follows. Results are summarized in Tables 1 to 4 below.

TVOC (ppm)

1 uL of a toluene standard solution (1.7 ug/uL) prepared by diluting 17 mg of toluene in 10 ml of methanol was injected into a test tube, and a chromatogram was obtained at 320° C./10 minutes using JTD-GC/MS-03. A peak area (Acta) of the chromatogram of the toluene standard solution was confirmed. 21 mg of PPS was injected into each PAT tube. The top of the test tube was covered with glass wool, and then a chromatogram was obtained at 320° C./10 minutes using JTD-GC/MS-03. The sum ($A_{compound}$) of peak areas of the chromatogram of volatile substances As shown in Table 2, the crosslinked PPS resins generally have a low melt index, whereas all of the linear PPS resins have a melt index of 700 g/10 min or more. In addition, 21330C and 21150C of the crosslinked PPS resins have a melt index of 450 g/10 min or less, but 21170C has a melt index of 700 g/10 min or more.

Fogging Test

Haze (%) evaluation for each grade of PPS resins was performed. The degree of fogging of gas collected on a glass was observed at an oil bath temperature of 240° C. and a cooling temperature of 23° C. during a fogging time of 5 hours using a hazemeter.

TABLE 3

| Classification | Linear type 1150C | Low chlorine-type 1370C | Crosslinked type 21150C |
|---|---|---|---|
| Degree of fogging (%) | 9.8 | 24.8 | 4.1 |

As shown in Table 3, the degree of fogging (haze) of the crosslinked PPS resin was 5 or less, whereas the degree of fogging of the linear PPS resin was 9 or more and the degree of fogging of the low chlorine-type PPS resin was 20 or more.

Molecular Weight Measurement

The weight-average molecular weights and number average molecular weights of PPS resins were measured using a high-temperature GPC method (device: ultra-high-temperature GPC SSC-7110, detector: R detector, solution: 1-chloro naphthalene, column temperature: 210° C., oven temperature: 250° C., and system temperature: 50° C.). Results are summarized in Table 4 below.

TABLE 4

| Classification | Linear type | | Crosslinked type | |
|---|---|---|---|---|
| | 1190C | 11100C | 21330C | 21150C |
| Mw | $2.7 \times 10^5$ | $2.4 \times 10^5$ | $3.4 \times 10^5$ | $3.1 \times 10^5$ |
| Mn | $0.66 \times 10^5$ | $0.52 \times 10^5$ | $0.54 \times 10^5$ | $0.56 \times 10^5$ |
| PDI (Mw/Mn) | 4.1 | 4.6 | 6.4 | 5.4 |

As shown in Table 4, the crosslinked PPS resins have a polydispersity index (PDI) of 5 to 7, whereas the linear PPS resins have PDI of less than 5.

Examples 1 to 4 and Comparative Examples 1 to 8

As shown in Table 5 below, respective components were mixed, and then melted and kneaded at a temperature section of 300 to 320° C. using a twin-screw extruder having a screw L/D value of 42 and a 0 value of 40 mm, thereby manufacturing polyphenylene sulfide resin composition pellets.

The manufactured pellets were dried at 120° C. for 2 hours or more, and then ISO standard specimens were manufactured at an injection-molding temperature of 310° C. and a mold temperature of 140° C. In addition, fluidity was measured under conditions of 315° C., a hold pressure of 110 bar, and 2 t using spiral shapes.

properties thereof were measured according to the following methods. Results are summarized in Tables 6 and 7 below.

A. Melt Index (MI) Measurement

A melt index (MI) was measured at 315° C. under a load of 5 kg based on ISO 1133 standard. Melt Indexcer (Model: G-01/manufacturer: toyoseiki) was used as a measurement equipment.

B. TVOC Measurement (Using JTD GC/FID Method)

1 uL of a toluene standard solution at a concentration of 4.0 ug/uL prepared by diluting 40 mg of toluene in 10 ml of methanol was injected into a Tenax PAT tube, a chromatogram was obtained under a condition of 320° C./10 minutes using JTD-GC/01, and a peak area (Acta) of a chromatogram of the toluene standard solution was observed. 50 mg of each composition was injected into a PAT tube, and the top of the test tube was covered with glass wool. Next, a chromatogram was obtained under a condition of 320° C./10 minutes using JTDGC/MS-01, and the sum of peak areas ($A_{compound}$) of a chromatogram of volatile substances present in a measurement sample was confirmed. TVOC was measured according to Equation 1 described above.

C. Tensile Strength Measurement

Tensile strength was measured in accordance with the ISO 527-1,2 standard. Here, a test speed was 5 mm/min, and UTM manufactured by Zwick was used as a measurement equipment.

D. Flexural Strength Measurement

Flexural strength was measured in accordance with the ISO 178 standard. Here, a test speed was 1.3 mm/min, and UTM manufactured by Zwick was used as a measurement equipment.

E. Impact Strength Measurement

Impact strength (V-notched Charpy, $kJ/m^2$): Measured in accordance with standard measurement ISO 179.

TABLE 5

| Unit: wt % | PPS resin | | | | Glass fiber | | Coupling agent | Antioxidant | Lubricant | Anti-hydrolysis agent |
|---|---|---|---|---|---|---|---|---|---|---|
| | 21150C | 1170C | 1190C | 11100C | 309C | 910-10P 415A | | | | |
| Example 1 | 49.7 | | | | 50 | | | | | 0.3 |
| Example 2 | 49.9 | | | | | 50 | | | | 0.1 |
| Example 3 | 59.9 | | | | 40 | | | | | 0.1 |
| Example 4 | 49.9 | | | | 50 | | | | | 0.1 |
| Comparative Example 1 | 59.5 | | | | 40 | | 0.2 | 0.1 | 0.2 | |
| Comparative Example 2 | 60 | | | | 40 | | | | | |
| Comparative Example 3 | 59.8 | | | | 40 | | 0.2 | | | |
| Comparative Example 4 | | 49.9 | | | 50 | | | | | 0.1 |
| Comparative Example 5 | | | 49.9 | | 50 | | | | | 0.1 |
| Comparative Example 6 | | 49.9 | | | 50 | | | | | 0.1 |
| Comparative Example 7 | | | | 49.9 | 50 | | | | | 0.1 |
| Comparative Example 8 | 49.9 | | | | | 50 | | | | 0.1 |

Experimental Example 1

The polyphenylene sulfide resin composition specimens manufactured in Examples 1 to 4 and Comparative Examples 1 to 8 were allowed to stand at 23° C. and at a relative humidity of about 60% for 48 hours, and then the F. Heat Deflection Temperature (HDT) Measurement A temperature due to thermal deformation under a high load of 1.80 MPa was measured by ISO 75-1,2 method.

G. Spiral Flow Length

To check how much a resin flowed in a mold using the Engel 80 injection machine, an injection pressure and an injection speed were removed, and the resin was injection-molded using only a holding pressure. The flow length of a resin composition was measured under the condition of applying a holding pressure of 110 bar at a cylinder temperature of 315° C. and a mold temperature of 120° C. or higher H. Volatile Weight Loss A sample was placed in a 260° C. gear oven and, after heating for 2 hours, the sample was taken out of the oven to measure a weight loss relative to the initial weight of the sample. The weight loss was expressed as a volatile weight loss (%).

I. Pressure Increase Rate and Outgassing Rate

As described above, an injection-molded specimen as much as its total surface area to be 147,840 mm² was fed into a vacuum bath having a vacuum bath volume of 3.26 L. The bath was exhausted under conditions of volume/surface of 2.21 E–03 l/cm², an exhaust temperature of 150° C., and an exhaust time of 15 hours so as to make the inside of the bath in a vacuum state, and then, at the time point of 5 hours to 12 hours, a pressure increase rate and outgassing rate in the inside of the bath were measured. A more specific measurement process (test process) was as follows;

(1) prepare an injection-molded specimen (9 spacers with a size of 5×5, total surface area: 147,840 mm²)→(2) wash the spacers for 0.25 hours with ultrasonic waves (h)→(3) dry the spacers at 70° C. for 3 hours (h)→(4) insert the spacers into a vacuum bath→(5) operate a vacuum pump and a heater (start exhausting)→(6) heat at 150° C. for 15 hours (h)→(7) stop the heater (heater off), and then cool at room temperature for 4.5 hours (h)→(8) stop the vacuum pump (terminate exhausting)→(9) measure an outgassing rate from 5 hours to 12 hours after the vacuum pump is stopped.

TABLE 6

| Classification | Melt index (g/10 min) | TVOC (ppm) | Tensile strength (MPa) | Flexural strength (MPa) | Impact strength (kJ/m²) | HDT (° C.) |
|---|---|---|---|---|---|---|
| Example 1 | 22.7 | 141.5 | 212 | 293 | 10.3 | 273.2 |
| Example 2 | 42.7 | 131 | 212 | 295 | 11.0 | 273.1 |
| Comparative Example 1 | 43.2 | 139.2 | 208 | 275 | 9.9 | 273.2 |
| Comparative Example 2 | 45 | 69.4 | 193 | 273 | 9.8 | 273.8 |
| Comparative Example 3 | 38 | 113.3 | 204 | 279 | 10.3 | 273.6 |
| Comparative Example 4 | 32.5 | 141.5 | 202 | 274 | 10.4 | 275.2 |
| Comparative Example 5 | 24.5 | 182.6 | 202 | 279 | 9.8 | 275.1 |

As shown in Table 6, it can be confirmed that all of the tensile strength, flexural strength, impact strength, and thermal strength of the polyphenylene sulfide resin compositions of Examples 1 and 2 according to the present invention are excellent, compared to Comparative Examples 1 to 5. Accordingly, it can be confirmed that the polyarylene sulfide resin composition according to the present invention can realize excellent insulation performance and exhibit excellent impact resistance and support performance, when provided in a thin thickness. Therefore, the polyarylene sulfide resin composition according to the present invention is ecofriendly and harmless to the human body, and can be usefully applied to electronic products, such as refrigerators, requiring an insulator to increase an internal volume ratio and improve impact resistance, support performance and heat insulation effect. Accordingly, it can be confirmed that the polyarylene sulfide resin composition according to the present invention can increase energy use efficiency and can greatly increase the effective volume of an equipment.

TABLE 7

| Classification | Melt index (g/10 min) | TVOC (ppm) | Volatile weight loss (%) | Spiral flow length (cm) | Tensile strength (MPa) | Flexural strength (MPa) | Impact strength (kJ/m²) | HDT (° C.) |
|---|---|---|---|---|---|---|---|---|
| Example 3 | 40.9 | 92.1 | 0.115 | 42.8 | 195 | 268 | 10.8 | 273.9 |
| Example 4 | 26.3 | 114.1 | 0.109 | 34 | 215 | 296 | 10.7 | 275.1 |
| Comparative Example 6 | 32.5 | 141.5 | 0.204 | 33.4 | 202 | 274 | 10.4 | 273.5 |
| Comparative Example 7 | 37.0 | 339.4 | 0.234 | 44.8 | 196 | 280 | 11.6 | 275.5 |
| Comparative Example 8 | 68.0 | 127 | 0.103 | — | 105 | 140 | 5.8 | — |

In addition, as shown in Table 7, it can be confirmed that the polyphenylene sulfide resin compositions of Examples 3 and 4 according to the present invention exhibit less volatile weight loss, a low TVOC content, and excellent tensile strength and flexural strength, compared to Comparative Examples 6 to 7. Particularly, it can be confirmed that the amount, i.e., an outgassing rate (torr·l/cm²·sec), of gas released in the vacuum environment after baking at 150° C. for 15 hours is very low in Example 3 ($0.525 \times 10^{-10}$) and Example 4 ($0.317 \times 10^{-10}$) which are low compared to existing technologies. However, it can be confirmed that the polyphenylene sulfide resin composition of Comparative Example 8 has very poor physical and thermal properties, and thus, it is not even necessary to measure the spiral flow length and heat deflection temperature thereof. Accordingly, it can be re-confirmed that the polyarylene sulfide resin composition according to the present invention can realize excellent insulation performance even when provided in a thin thickness, is ecofriendly and harmless to the human body due to low TVOC, and has low outgassing properties due to less volatile weight loss, thereby being capable of being usefully applied to electronic products, such as a refrigerator, requiring an adiabatic body and increasing an internal volume ratio and providing excellent impact resistance.

Additional Examples 1 to 5 and Additional Comparative Examples 1 to 4

Polyphenylene sulfide resin compositions were prepared in the same manner as in Example 1 except that respective components were mixed according to Table 8 below.

TABLE 8

| Unit: wt % | Crosslinked PPS resin 21150C | Crosslinked PPS resin 21330C | Crosslinked PPS resin 21170C | Glass fiber 309C | Coupling agent | Antioxidant | Lubricant | Anti-hydrolysis agent |
|---|---|---|---|---|---|---|---|---|
| Additional Example 1 | 49.9 | | | 50 | | | | 0.1 |
| Additional Example 2 | 59.9 | | | 40 | | | | 0.1 |
| Additional Example 3 | 54.9 | | | 45 | | | | 0.1 |
| Additional Example 4 | 44.9 | | | 55 | | | | 0.1 |
| Additional Example 5 | | 49.9 | | 50 | | | | 0.1 |
| Additional Comparative Example 1 | 50 | | | 50 | | | | |
| Additional Comparative Example 2 | 39.9 | | | 60 | | | | 0.1 |
| Additional Comparative Example 3 | | | 49.9 | 50 | | | | 0.1 |
| Additional Comparative Example 4 | 69.9 | | | 30 | | | | 0.1 |

Experimental Example 2

Each of the polyphenylene sulfide resin composition specimens manufactured in Additional Examples 1 to 5 and Additional Comparative Examples 1 to 4 was allowed to stand at 23° C. and a relative humidity of about 60% for 48 hours, and then the properties thereof were measured according to the above methods or the following methods. Results are summarized in Table 9 below.

Tensile Modulus Measurement

Tensile modulus measurement was measured in accordance with the ISO 527-1,2 standard. Here, a test speed was 5 mm/min, and UTM manufactured by Zwick was used as a measurement equipment.

Flexural Modulus Measurement

Flexural modulus measurement was measured in accordance with the ISO 178 standard. Here, a test speed was 1.3 mm/min, and UTM manufactured by Zwick was used as a measurement equipment.

Heating Loss

After heating a sample at 120° C. for 2 hours using an oven, the weight thereof was measured. In addition, the weight of the sample was measured after heating the same at 260° C. for 2 hours. Next, a heating loss was calculated using Mathematical Equation 1 below.

$$\text{Heating loss (\%)} = [(\text{Weight after heating at } 120°\text{C. for 2 hours} - \text{Weight after heating at } 260°\text{C. for 2 hours}) / (\text{Weight after heating at } 120°\text{C. for 2 hours})] \times 100 \quad [\text{Mathematical Equation 1}]$$

TABLE 9

| Classification | Tensile strength (MPa) | Tensile modulus (MPa) | Flexural strength (MPa) | Flexural modulus (MPa) | Impact strength (kJ/m2) | Spiral flow length (cm) | Heating loss |
|---|---|---|---|---|---|---|---|
| Additional Example 1 | 195 | 21450 | 260 | 16022 | 9.0 | 38.0 | 0.074 |
| Additional Example 2 | 185 | 16710 | 247 | 12695 | 8.9 | 47.0 | 0.088 |
| Additional Example 3 | 191 | 18090 | 261 | 14344 | 9.5 | 43.0 | 0.085 |
| Additional Example 4 | 194 | 22960 | 268 | 17975 | 8.9 | 33.0 | 0.09 |
| Additional Example 5 | 195 | 19840 | 266 | 15713 | 9.0 | 28.0 | 0.087 |
| Additional Comparative Example 1 | 195 | 21300 | 262 | 16263 | 9.1 | 36.5 | 0.111 |
| Additional Comparative Example 2 | 179 | 24410 | 256 | 20023 | 8.4 | 27.5 | 0.113 |
| Additional Comparative Example 3 | 204 | 22280 | 285 | 16365 | 10.8 | 40.0 | 0.112 |
| Additional Comparative Example 4 | 156 | 13410 | 208 | 10473 | 9.0 | 60.5 | 0.113 |

In addition, as shown in Table 9, it can be confirmed that the polyphenylene sulfide resin compositions of Additional Examples 1 to 5 according to the present invention have mechanical strength or flowability the same or superior to those of Additional Comparative Examples 1 to 4, but a heating loss which is an indirect indicator of the heat insulation properties of a vacuum adiabatic body is very low in the polyphenylene sulfide resin compositions of Additional Examples 1 to 5. Accordingly, it can be confirmed that the polyphenylene sulfide resin compositions of Additional Examples 1 to 5 according to the present invention have excellent heat insulation properties. In a process of vacuuming the inside of an adiabatic body for insulation, it is difficult to create a high vacuum condition when the amount of outgassing of a heat insulating material is large, i.e., when heating loss is large, and even if a high vacuum condition is created, an exhaust time greatly increases, which is not economical. Accordingly, a heat insulating material having low heating loss as in the present invention is very advantageous for manufacturing an adiabatic body. Notably, it can be confirmed that, in both Additional Comparative Example 2 according to the present invention wherein the content of glass fiber is excessive, and Additional Comparative Example 4 according to the present invention wherein the content of glass fiber is insufficient, a heating loss is high, compared to Additional Examples 1 to 5, which indicates that heat insulation properties are poor.

The invention claimed is:

1. A polyarylene sulfide resin composition, comprising:
   100 parts by weight of a crosslinked polyarylene sulfide having a melt index of 50 to 480 g/10 min;
   60 to 120 parts by weight of glass fiber; and
   0.1 to 0.3 parts by weight of an anti-hydrolysis agent,
   wherein the melt index is measured at 315° C. under a load of 5 kg,
   wherein the crosslinked polyarylene sulfide has a polydispersity index (PDI) of 5.4 to 6.4,
   wherein the crosslinked polyarylene sulfide contains one or more selected from the group consisting of 2,6-diisopropylphenyl isocyanate, 2,6-diisopropylaniline, 1,4-bis(phenylthio)-benzene, 1,6-hexanediol and p-chloro-N-methylanilin in an amount of 100 ppm or less, and
   wherein the polyarylene sulfide resin composition has a volatile weight loss of 0.15% or less at 260° C. for 2 hours.

2. The polyarylene sulfide resin composition according to claim 1, wherein the polyarylene sulfide resin composition has a heating loss of 0.10 or less, wherein the heating loss is calculated according to Mathematical Equation 1:

Heating loss (%)=[(Weight after heating at 120° C. for 2 hours−Weight after heating at 260° C. for 2 hours)/(Weight after heating at 120° C. for 2 hours)]×100. [Mathematical Equation 1]

3. The polyarylene sulfide resin composition according to claim 1, wherein a pressure increase rate of the polyarylene sulfide resin composition is $1.77 \times 10^{-4}$ torr/h or less, wherein the pressure increase rate of the polyarylene sulfide resin composition is measured from a time point of 5 hours to a time point of 12 hours thereafter, after placing an injection specimen to have a total surface area of 147,840 mm$^2$, which is produced through injection-molding of the polyarylene sulfide resin composition, in a vacuum bath having a vacuum bath volume of 3.26 L, and evacuating under a condition of a volume/surface of 2.21 E−03 l/cm$^2$, an exhaust temperature of 150° C., and an exhaust time of 15 hours to make the inside of the bath to a vacuum state.

4. The polyarylene sulfide resin composition according to claim 1, wherein the glass fiber is glass fiber surface-treated with a silane-based compound.

5. The polyarylene sulfide resin composition according to claim 1, wherein the glass fiber has an average diameter of 5 to 15 μm and an average length of 1 to 5 mm.

6. The polyarylene sulfide resin composition according to claim 1, wherein the anti-hydrolysis agent is a carbodiimide-based polymer.

7. The polyarylene sulfide resin composition according to claim 6, wherein the carbodiimide-based polymer has a melting point of 56 to 95° C.

8. The polyarylene sulfide resin composition according to claim 6, wherein the carbodiimide-based polymer is a polymer represented by Formula 5:

[Formula 5]

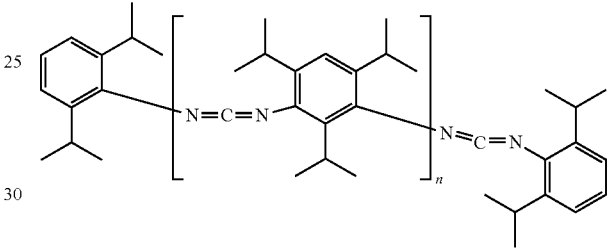

wherein n is an integer of 1 to 15.

9. The polyarylene sulfide resin composition according to claim 1, wherein the polyarylene sulfide resin composition has a total volatile organic compounds (TVOC) value of 120 ppm or less, a tensile strength of 200 to 250 MPa, and a flexural strength of 290 to 350 MPa.

10. The polyarylene sulfide resin composition according to claim 1, wherein the polyarylene sulfide resin composition has a heat deflection temperature (HDT) of 270 to 300° C. and a melt index of 23 to 41 g/10 min, wherein the melt index is measured at 315° C. under a load of 5 kg.

11. A method of preparing the polyarylene sulfide resin composition of claim 1, the method comprising:
   melt-kneading and extruding 100 parts by weight of the crosslinked polyarylene sulfide having a melt index of 50 to 480 g/10 min, 60 to 120 parts by weight of the glass fiber, and 0.01 to 3% by weight of the anti-hydrolysis agent, wherein the melt index is measured at 315° C. under a load of 5 kg.

12. A heat insulating material, comprising the polyarylene sulfide resin composition according to claim 1.

13. The heat insulating material according to claim 12, wherein the heat insulating material is a vacuum heat-insulating material for a refrigerator.

14. The polyarylene sulfide resin composition according to claim 1, wherein the crosslinked polyarylene sulfide has a weight-average molecular weight of $3 \times 10^5$ to $4 \times 10^5$ g/mol, and a number average molecular weight of $0.52 \times 10^5$ to $0.59 \times 10^5$ g/mol.

* * * * *